United States Patent [19]
Johnson et al.

[11] Patent Number: 5,174,932
[45] Date of Patent: Dec. 29, 1992

[54] PROCESS FOR GAS ASSISTED INJECTION MOLDING

[75] Inventors: Tom W. Johnson, Hunting Valley; Jay F. Moldovanyi, Brecksville, both of Ohio

[73] Assignee: Nitrojection Corporation, Middlefield, Ohio

[21] Appl. No.: 716,799

[22] Filed: Jun. 18, 1991

[51] Int. Cl.$^5$ ............... B29C 45/00; B29C 45/24; B29D 22/00
[52] U.S. Cl. .......................... 264/39; 55/97; 264/37; 264/328.8; 264/328.12; 264/328.13; 264/572
[58] Field of Search ............ 264/37, 39, 85, 237, 264/327, 328.8, 328.12, 328.13, 348, 500, 572; 55/97

[56] References Cited
U.S. PATENT DOCUMENTS

| | | |
|---|---|---|
| 2,940,123 | 6/1960 | Beck et al. |
| 4,033,710 | 7/1977 | Hanning ............... 425/543 |
| 4,106,887 | 8/1978 | Yasuike et al. ......... 425/549 |
| 4,140,672 | 2/1979 | Kataoka ............... 264/45.1 |
| 4,555,225 | 11/1985 | Hendry ............... 425/4 R |
| 4,657,496 | 4/1987 | Ozeki et al. ........... 425/130 |
| 4,905,901 | 3/1990 | Johnson ............... 239/135 |
| 5,030,076 | 7/1991 | Ebenhofer et al. ....... 264/572 X |
| 5,078,949 | 1/1992 | Strunk et al. ........... 264/572 |
| 5,080,570 | 1/1992 | Baxi et al. ............. 264/572 X |

OTHER PUBLICATIONS

The Best of Two Worlds in Plastic Processing, *Machine Design Magazine*, Dec. 9, 1982, by Donald R. Dreger, Staff Editor.

*Primary Examiner*—Leo B. Tentoni
*Attorney, Agent, or Firm*—Fay, Sharpe, Beall, Fagan, Minnich & McKee

[57] ABSTRACT

A method for injecting a viscous fluid, such as a thermoplastic, and a non-viscous fluid, such as a gas, into a mold cavity of a mold body includes providing a valve element mounted for reciprocation in a nozzle body flow passage to regulate a flow of viscous fluid through the nozzle body discharge end and into a mold cavity. The valve element includes a barrel having a first end selectively engaging a portion of the nozzle body discharge end to prevent a flow of viscous fluid therepast and a second end. A bore extends longitudinally through the barrel and a pin is positioned in the barrel bore. The pin has a first end located adjacent the barrel first end and a second end. A non-viscous fluid flow passage is defined between the pin and the barrel. A viscous fluid flows through the nozzle body flow passage around the barrel and into a mold cavity. A non-viscous fluid flows through the non-viscous fluid flow passage defined between the barrel and the pin and into the mold cavity. A non-viscous fluid cavity is formed in the viscous fluid which then cools to form an injection molded part. An initial portion of the non-viscous fluid is then allowed to flow out of the non-viscous fluid cavity.

26 Claims, 6 Drawing Sheets

PROCESS FOR GAS ASSISTED INJECTION MOLDING

BACKGROUND OF THE INVENTION

This invention generally pertains to processes for injection molding. More specifically, the present invention relates to a method for a fluid assisted injection molding of plastic materials.

The invention is particularly applicable to a gas assisted injection molding process in which a nozzle is utilized to inject a viscous fluid, such as a molten plastic, into a mold cavity together with a non-viscous fluid, such as a gas. However, it will be appreciated by those skilled in the art that the invention has broader applications and may also be adapted for use in many other injection molding environments where both a relatively viscous fluid, such as a plastic or wax, and a relatively non-viscous fluid such as a gas or liquid, are injected into a mold cavity.

Recently, gas assisted injection molding has gained popularity. In this process, the mold cavity is filled with a plasticized thermoplastic material, generally to a volume less than 100% of the mold cavity, and an inert gas is injected under pressure into the plasticized material to fill the rest of the volume in the mold cavity. The gas is injected into the center of the flow of plastic but does not mix with the melt and instead runs along specially designed channels. In this way, with a suitably designed part, a continuous network of hollowed out sections can be provided. The material displaced by the gas from the middle of the sections moves out to fill the remainder of the mold space.

This network of gas channels provides a uniform pressure distribution system throughout the mold space during part rehardening and cool down, thus minimizing internal stresses within the part. Gas injection provides a solution to a number of problems that have long plagued the injection molding industry. These include reducing stress and warpage of the plastic part, eliminating sink marks and providing smooth surfaces on the injection molded part. In addition, clamp tonnage requirements of the mold halves can be reduced in comparison to conventional injection molding processes. The gas injection molding process also permits differing wall thicknesses on a part and faster cycle times in comparison with the conventional injection molding processes. Also, gas assisted injection molding reduces the need for external flow runners.

Several types of nozzles are known for gas assisted injection molding. However, many of these nozzles do not vent the gas back through the nozzle when the discharge of the gas is required. Even those nozzles which do vent the gas back through the nozzle are unsatisfactory because the molten plastic remaining in the nozzle, or in the sprue and runner system, is frequently vented back along with the gas thus causing one of the major difficulties with gas assisted injection molding, namely the plugging of gas channels in the nozzle with thermoplastic material which solidifies and blocks off any further gas flow through these channels. In addition, the gas piping and valves downstream from the nozzle can become plugged. The nozzle then becomes unuseable until it is cleaned out, which is a time-consuming, difficult and expensive process.

Current gas assisted injection molding processes do not allow an injection molding nozzle to operate day in and day out without plugging. Therefore, the nozzle frequently needs to be cleaned as explained above. Conventional gas assisted injection molding processes also do not allow a cleaning of the nozzle without disassembly thereof. In addition, the current gas assisted injection molding processes do not allow a recycling of the gas while preventing various molding chemicals that are used in the molding process from being recycled along with the gas.

Accordingly, it has been considered desirable to develop a new and improved gas assisted injection molding process which would overcome the foregoing difficulties and others while providing better and more advantageous overall results.

BRIEF SUMMARY OF THE INVENTION

According to the present invention, a method for injecting a viscous fluid such as a thermoplastic and a non-viscous fluid such as a gas into a mold cavity of a mold body is provided.

More particularly in accordance with the method, a valve element is mounted for reciprocation in a nozzle body flow passage to regulate a flow of viscous fluid through a nozzle body discharge end and into a mold cavity. The valve element comprises a barrel having a first end and a second end, the first end selectively engaging a portion of the nozzle body discharge end to prevent a flow of viscous fluid therepast. A bore extends longitudinally through the barrel. A pin is positioned in the barrel bore with the pin having a first end located adjacent the barrel first end and a second end. A non-viscous fluid flow passage is defined between the pin and the barrel. A viscous fluid is flowed through the nozzle body flow passage around the barrel and into the mold cavity. A non-viscous fluid is flowed through the non-viscous fluid flow passage around the pin and into the mold cavity.

The process can further comprise the step of venting the viscous fluid. The step of venting preferably comprises the subsidiary step of flowing the non-viscous fluid into a container. The step of venting preferably takes place through the non-viscous fluid flow passage defined between the pin and the barrel.

Preferably the process also includes the step of flowing the non-viscous fluid from the container and through a pump so that the non-viscous fluid can be recycled and used again in the fluid assisted injection molding process.

One advantage of the present invention is the provision of a new and improved fluid assisted injection molding process which allows the flow of a viscous fluid, such as a molten plastic, into a mold cavity and the flow of a non-viscous fluid, such as a gas, into the mold cavity and allows a venting of the non-viscous fluid out of the mold cavity.

Another advantage of the present invention is the provision of a fluid assisted injection molding process in which an initial outflow of fluid during venting of a non-viscous fluid from a mold cavity is limited in order to allow the injection molded part, especially its fluid channels and sprue, to set up completely.

Still another advantage of the present invention is the provision of a fluid assisted injection molding process by which the nozzle is not as prone to plugging as such nozzles usually are.

Yet another advantage of the present invention is the provision of a fluid assisted injection molding process in which a substantially annular flow passage is defined between a pin and a barrel for the flow of a non-viscous fluid.

Yet still another advantage of the present invention is the provision of a fluid assisted injection molding process in which a non-viscous fluid flow passage through the nozzle is cleaned out after a set number of injection molding shots by use of a high pressure fluid, so as to keep the fluid flow passage clean.

A further advantage of the present invention is the provision of a gas assisted injection molding process in which one or more reservoirs are provided to initially store a gas during its outflow from a gas cavity formed in a plastic mass held in the mold chamber. Thereafter, the gas can be either recycled or vented to the atmosphere.

A still further advantage of the present invention is the provision of a gas assisted injection molding process in which an outflow of gas during venting is muffled.

A yet further advantage of the present invention is the provision of a gas assisted injection molding process in which an initial portion of the gas is vented from a gas cavity formed in the product and the remaining portion of the gas in the gas cavity is cooled thereby setting up the part. Thereafter, the remaining portion of the gas is vented.

An additional advantage of the present invention is the provision of a gas assisted injection molding process in which contaminants in the gas cavity formed in the injection molded product are vented along with an initial portion of the gas while a remaining portion of the gas is recycled.

Still other benefits and advantages of the invention will become apparent to those skilled in the art upon a reading and understanding of the following detailed specification.

BRIEF DESCRIPTION OF THE DRAWINGS

The invention may take form in a certain structure preferred and alternate embodiments of which will be described in detail in this specification and illustrated in the accompanying drawings.

In the drawings.

DETAILED DESCRIPTION OF THE PREFERRED AND ALTERNATE EMBODIMENTS

Figure 1:
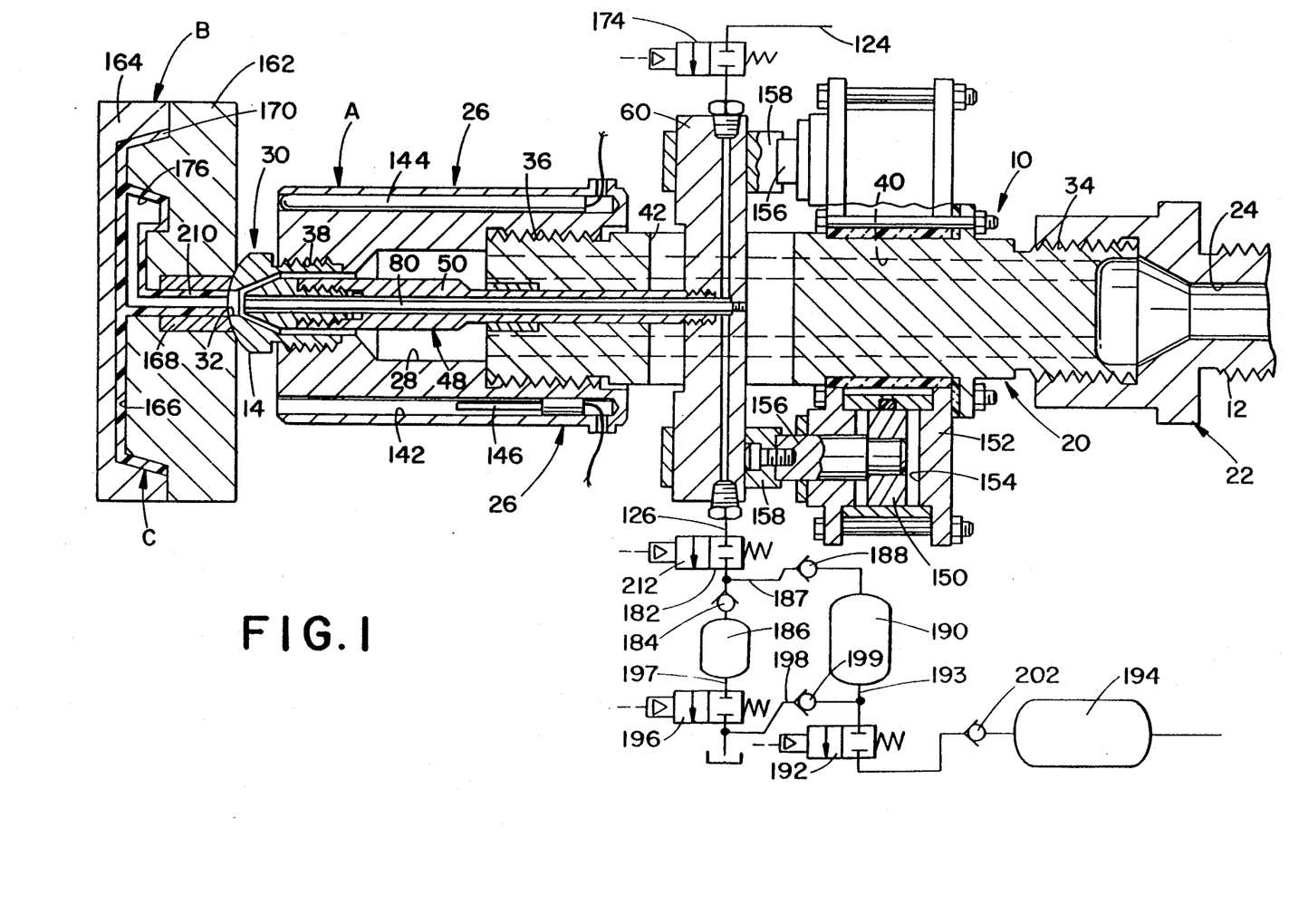
FIG. 1 is a side elevational view in cross-section of a gas assisted injection molding apparatus and a mold together with a gas inlet and exhaust system therefor according to the preferred embodiment of the present invention.

Referring now to the drawings, wherein the showings are for purposes of illustrating preferred and alternate embodiments of the invention only and not for purposes of limiting same, FIG. 1 shows a fluid assisted injection molding apparatus which includes the subject new nozzle A located adjacent a mold body B. While the nozzle is primarily designed for and will hereinafter be described in connection with an apparatus used for the gas assisted injection molding of molten thermoplastics, it should be appreciated that the nozzle could also be used in various other molding environments in which a relatively viscous fluid and a relatively non-viscous fluid are injected, such as for the production of lost wax masters and the like.

The nozzle comprises a nozzle body 10 having an inlet end 12 and a discharge end 14. The nozzle includes a housing having a central section 20 and an adaptor or rear section 22 having a longitudinal bore 24 extending therethrough. Also provided is a barrel housing 26 having a longitudinal bore 28 extending therethrough and a tip 30 which similarly has a longitudinal bore 32 extending therethrough. The adaptor 22 is suitably secured to the central section 20 by interengaging threads as at 34. Similarly, interengaging threads as at 36 secure the barrel housing 26 to the central section 20. Securing the tip 30 to the barrel housing 26 are suitable threads as at 38.

The central section 20 has a first, preferably kidney-shaped, aperture 40 extending longitudinally therethrough in an orientation which is coaxial with the bores 24, 28 and 32 of the adaptor, barrel housing and tip respectively. Preferably two such kidney-shaped apertures 40 are provided in the central section 20, as is known. This allows for the formation of the flow channel entirely through the nozzle A.

Figure 2:
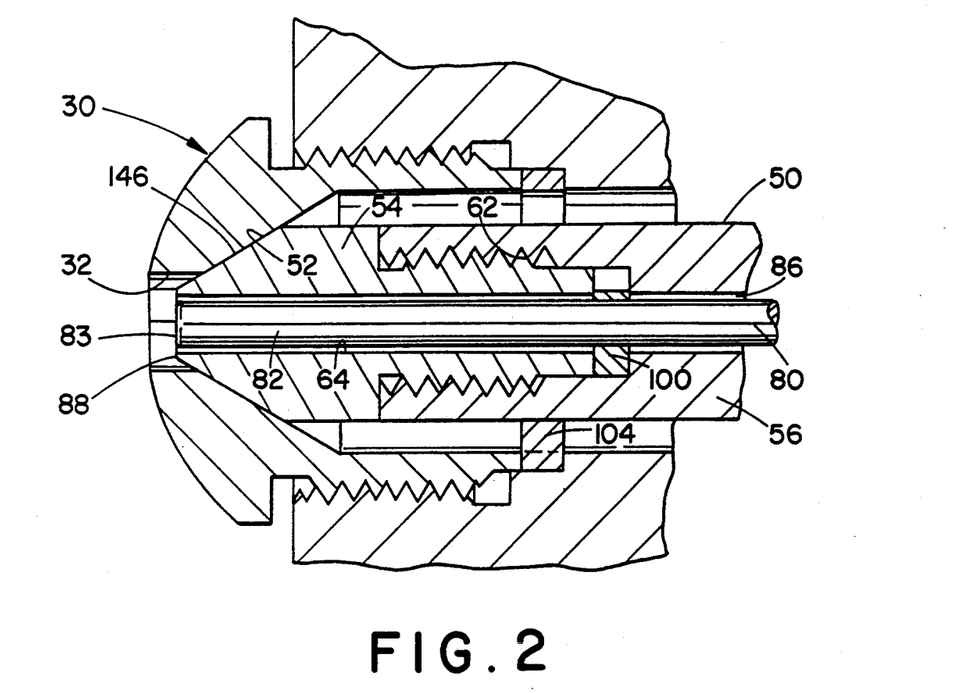
FIG. 2 is a greatly enlarged cross-sectional view of a portion of the apparatus of FIG. 1 with a reciprocating barrel being in a closed position.
Figure 3:
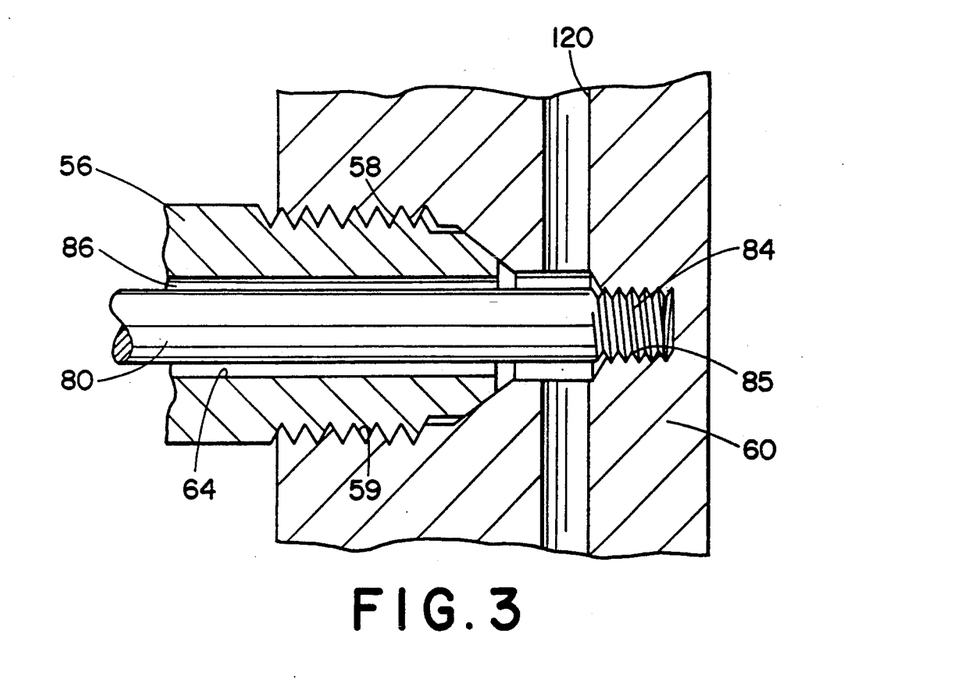
FIG. 3 is a greatly enlarged cross-sectional view of another portion of the apparatus of FIG. 1.

A second aperture 42 extends through opposing side walls of the central section 20 in a direction normal to the first aperture 40 and not in communication therewith. A valve body 48 is adapted to reciprocate in the nozzle body 10. For this purpose, a spreader or barrel 50 of the valve body is reciprocatingly mounted in the bore 28 of the barrel housing 26. With reference now also to FIG. 2, the barrel 50 has a tapered first end 52 located on a front section 54 thereof, as well as a rear section 56 having a threaded end portion as at 58 (FIG. 3). The end portion 58 allows the barrel 50 to be secured in a threaded bore 59 of a cross bar 60 which extends through the second aperture 42. A threaded area 62 may be utilized to secure the front end rear barrel sections 54 and 56 to each other.

Extending longitudinally through the front and rear sections 54 and 56 is a bore 64. A longitudinally extending path is thus defined through the barrel 50 by the bore 64.

Extending through the bore 64 is a suitably shaped pin 80 which has an external diameter of suitable size so that the pin does not interfere with the barrel 50. In other words, an external diameter of the pin 80 is smaller than an internal diameter of the bore 64. The pin 80 has a front end 82 which is located adjacent the barrel front end 52. The pin front end 82 has a front face 83. As shown in FIG. 3, the pin also has a suitably threaded rear end as at 84 so that the pin can be threaded into a suitable aperture 85 provided in the cross bar 60. With this design, the pin will reciprocate together with the barrel. Of course, it should be appreciated that other ways of securing the pin 80 in place so that it moves with the barrel are also possible.

Gas flow between the pin 80 and the barrel 50 will take place through a gas flow passage 86 which is defined between them, as is seen best in FIGS. 2 and 3. That gas flow passage is preferably an annular or sleeve-like passage around the pin 80. Since the pin 80 is secured to the barrel 50, the pin reciprocates with the barrel so that the pin front face 83 is always located approximately even with a tip 88 of the barrel front end 52 as shown in FIG. 2. Preferably, the pin 80 is in the shape of a right cylinder which has a substantially constant diameter. Other shapes for the pin are also possible so as to provide flow passages other than a simple annular passage having a constant diameter.

Located in the bore 64 is a spider 100 which supports the pin 80 so as to prevent its wobbling or movement in a direction transverse to the reciprocating motion of the barrel 50. A suitable spider 104, located in the bore 28, can support the barrel front end if desired. Again, this would be for the purpose of preventing the barrel front end from moving in a direction transverse to its reciprocating motion.

With reference now to FIG. 3, the gas passage 86 defined between the barrel 50 and the pin 80 communicates with an aperture 120 which extends longitudinally in the cross bar or cross link member 60. As shown in FIG. 1, the aperture 120 communicates at each end of the cross bar 122 with a respective suitable fluid line 124 and 126.

If desired, one or more longitudinally extending bores 142 can be provided in the barrel housing 26 to accommodate a conventional cartridge heater 144 or a conventional thermocouple 146.

As best seen in FIG. 1 the nozzle preferably further comprises a means for selectively urging the valve body 48 in a first direction so as to close the nozzle body discharge end 14 by abutting the side face 52 of the barrel 50 against an angled portion 146 (FIG. 2) of the tip 30, and in a second direction to allow a flow of molten thermoplastic through the tip bore 32. The means for selectively urging is secured to the nozzle body central section 20 and preferably comprises a toroidally-shaped piston 150 that is held in a housing 152 which defines a chamber or a cavity 154 in which the piston reciprocates as controlled by a pressurized fluid delivered selectively to one of the faces of the piston. Secured to a front surface of the piston are a pair of piston rods 156 which are connected at their free ends to a pair of holders 158. The holders, in turn, are so shaped as to hold the cross bar 60 and thus enable the entire valve body 48, including the barrel 50 and the pin 80, to be reciprocated.

The tip 30 adjoins the mold body B which includes a first mold half 162 and a second mold half 164. The mold halves define between them a mold cavity 166. Preferably, a sprue body 168 is located in the first mold half 162 and enables fluid to flow from the tip bore 32 into the mold cavity 166.

In use, an amount of molten thermoplastic 170 sufficient for the preparation of the injection molded product, and normally less than the volume of the mold cavity 166, is injected through bores 24, 40, 28 and 32, through the sprue body 168 and into the mold cavity 166. Either simultaneously therewith, or thereafter, a quantity of a suitable non-viscous fluid, such as a gas, is introduced through line 124, as controlled by a suitable directional valve 174 located in line 124. The gas, which is preferably a neutral gas such as nitrogen, can selectively flow through aperture 120, the gas flow passage 86 defined between the pin 80 and the barrel 50, through the tip bore 32, the sprue body 168 and into the mold cavity 166. The valve 174 may be a solenoid operated valve or may be an air operated valve as illustrated. The gas forms a fluid cavity 176 in the molten thermoplastic material 170 held in the mold cavity 166 and pushes the molten thermoplastic material out against the walls of the mold cavity. The thermoplastic material is thereupon allowed to cool until it is capable of retaining the shape imposed on it by the mold cavity.

Subsequently, the fluid is vented from the fluid cavity 176 created in the thermoplastic material and back through passage 86 and aperture 120. The fluid is preferably vented out through line 126 as regulated by a suitable second directional valve 182. Once it is desired to decompress the gas, the second directional valve 182, which can be an air operated valve, is opened to allow the gas to flow through a first check valve 184 located in line 126. The first check valve 184 is preferably a free flow or 1 psi valve. This valve allows the flow of the gas into a relatively small-sized first receiver 186. The size of the receiver 186 is approximately one-tenth of the total volume required to decompress the gas from the gas cavity 176 formed in the plastic material. Thus, vessel 186 will fill up with gas in a short period of time such as approximately one second.

It is estimated that the first receiver or vessel 186 will accommodate up to 10% of the amount of gas which is held in the gas cavity 176. It has been found that the venting of the initial 10% of the gas into the smaller receiver 186 will often vent certain contaminants from the injection molded product as well. Such contaminants or chemicals may be found in e.g. flame-retardant plastics or the like. Normally, with solid plastic parts a "juicing" of such contaminants can be seen on the mold halves when they are separated and the part is removed. It has been found that these contaminants flow out with the initial 10% of the gas and condense in the first receiver 186 and form an oily film on the walls of the receiver.

Communicating with line 126 is a second fluid line 187. As soon as the first receiver 186 is full, gas pressure will increase in the outflow line 126. This will ultimately force a second check valve 188, located in line 187, which valve can be set at approximately 25 to 50 p.s.i., to open and allow the gas to flow into a second receiver 190 communicating with line 187. The second receiver 190 is considerably larger in volume than the first receiver 186. The remaining gas in the gas cavity 176 will thus flow through the second relief valve 188 and into the second receiver 190. Approximately at the time when the gas cavity 176 is completely decompressed, a third directional valve 192 located in a third fluid line 193 communicating with a remote end of the second receiver 190 is opened. This will allow a decompression of the gas from the second receiver 190, preferably, into a third receiver 194. Since the third receiver 194 is of a yet larger volume, it will accommodate all of the gas in the second receiver 190 while reducing the pressure of the gas. The gas can subsequently be vented from the third receiver 194 and preferably recycled, but could alternatively be vented to the atmosphere.

A fourth directional valve 196 is located in a fourth fluid line 197 communicates with a remote end of the first receiver 186. At approximately the same time as the third directional valve 192 is opened, the fourth valve 196 is opened. This allows a venting of the gas, and contaminants, held in the first receiver 186 through the line 197 and, preferably, to sump. A fifth fluid line 198 communicates the fourth fluid line 197 with the third fluid line 193. Positioned in the fifth fluid line 198 is a suitable check valve 199, which can be set to approximately 1 psi or the like. In this way, should it be desired to reuse the gas in the first receiver 186, the free end of the fourth fluid line 197 can be blocked. When valve 196 is then opened, the check valve 199 will allow a venting of any gas in the first receiver 186 through the fifth fluid line 198 past the third directional valve 192 and into the third receiver 194. If desired, a check valve 202 can be provided in the third fluid line 193 between the third directional valve 192 and the third receiver 194 in order to prevent a backflow of fluid from the receiver 194.

The check valve 202 allows the flow of gas or fluid into the third receiver 194. In case this receiver fills up or the recycling system malfunctions, the check valve 202 prevents gas back pressure in receiver 194 backing gas up into the first and second vessels 186 and 190 because that would unnecessarily slow down the venting of the cavity 176. It is evident that the second directional valve 182 is closed during the injection of the gas whereas the first directional valve 174 is kept closed during the venting of the gas.

It is desirable that a suitable conventional microprocessor (not illustrated) be utilized to control the actuation of the several directional valves 174, 182, 192 and 196. In this way, when a suitable timer set in the microprocessor times out, the first valve 174 will close, the second valve 182 will open. At a predetermined time thereafter, which may be on the order of five to ten seconds, the third directional valve 192 and fourth directional valve 196 will open. At a suitable time thereafter, the microprocessor will close these valves.

Gas in the gas cavity 176 is heated because it is surrounded by the hot thermoplastic material 170. The gas will cool somewhat as the thermoplastic material 170 forming a part C cools in the mold cavity 166. Upon venting of the gas, a portion of the gas in the gas cavity 176, preferably approximately 10% of the gas as mentioned, will flow into the first receiver 186. Removal of approximately 10% of the volume of the gas in the gas cavity 176 will cool the remaining gas in the gas cavity through expansion of the remaining gas. That, in turn, will help "set up" i.e. cool and solidify, the injection molded part C made from the thermoplastic material 170, more particularly the fluid flow channels in the part where some molten thermoplastic may still reside. In other words, the cooling of the gas in the gas cavity 176 will also tend to solidify any still molten thermoplastic adjacent the gas cavity 176. One of the advantages of this design is that the thermoplastic in the sprue body 168 of the mold, the so called sprue 210 of the article C, will be cooled during this step. This reduces the tendency of any still molten thermoplastic adjacent the gas cavity 176 to be sucked back into the nozzle mechanism during the venting procedure. The nozzle can therefore run longer and more reliably without plugging. Thus a large number of uninterrupted injection molding cycles can be obtained.

After venting the first 10% of the gas, the remainder of the gas will be allowed to flow into the second receiver 190. Since the receiver 190 is relatively large in volume in relationship to the first receiver 186, it will allow the gas to cool down further due to its expansion and this will reduce the pressure of the gas. Thus a relatively cool low pressure gas eventually flows into the third receiver 194 which is of a still higher capacity so that further gas expansion allows a further fall of gas pressure and temperature to perhaps room temperature or even a temperature below that. The purpose of the venting, therefore, is not only to recapture gas and allow a reduction of the cost thereof, but also to provide, due to the use of receivers of progressively larger size, a relatively cool gas in the recycling process.

If gas is let out of the gas cavity 176 too quickly, the sprue 210 will collapse and trap pressurized gas in the part C. Thereafter when the part C is taken out of the mold B, the gas may explode from the gas cavity 176 rupturing the part and perhaps causing injury. Alternatively, if the gas is let out too fast, a gas flow path in the part C may collapse even if the sprue 210 remains intact. The collapse of a gas flow path will also trap gas in the part and, when the part is removed from the mold B, may lead to an explosion of the gas from the part.

Another problem with gas which is let out of the part too quickly is that molten thermoplastic may also be sucked back through the gas flow path 86 during venting. Therefore, it would be advantageous to limit the initial flow of gas out of the part to allow the sprue 210 and the rest of the gas channels to set up. Thereafter, gas can be vented as rapidly as is desired. The venting system of FIG. 1 accomplishes this task.

In order to reduce the amount of plastic buildup between the exterior of the pin 80 and the interior surface of the barrel bore 62 or in the tip bore 32, it may also be advantageous to blow a gas through the passage 86 and preferably to the atmosphere. In other words, when the mold halves 162 and 164 are separated, after a certain number of injection molding sequences or shots, gas is introduced without the introduction of thermoplastic. For example, after, e.g., twenty shots of thermoplastic 170, that is after twenty injection molded products C are produced and removed from the mold cavity 166, then before the twenty-first shot, it may be advantageous to direct a pressurized gas through the passage 86 to remove whatever thermoplastic particles may have become deposited onto the exterior surface of the pin 80 or onto the interior periphery of the bore 62 out of the gas passage. Such cleaning would also remove any contaminants which may have been deposited. The pressurized gas may be shop air or the neutral gas. As mentioned, the mold body B is preferably open at this time such that the mold halves 162 and 164 are spaced from each other. This allows a blast of gas to dislodge any plastic or contaminants in the gas flow channels. Thereafter, when the mold is closed, the twenty-first shot of thermoplastic 170 could be directed into the mold cavity by suitable retraction of the barrel 50. It should be evident that any other desirable number of shots of plastic can take place presumably depending upon the type of plastic used and the tolerances maintained between the exterior periphery of the pin 80 and the interior periphery of the barrel bore 62.

Figure 4:
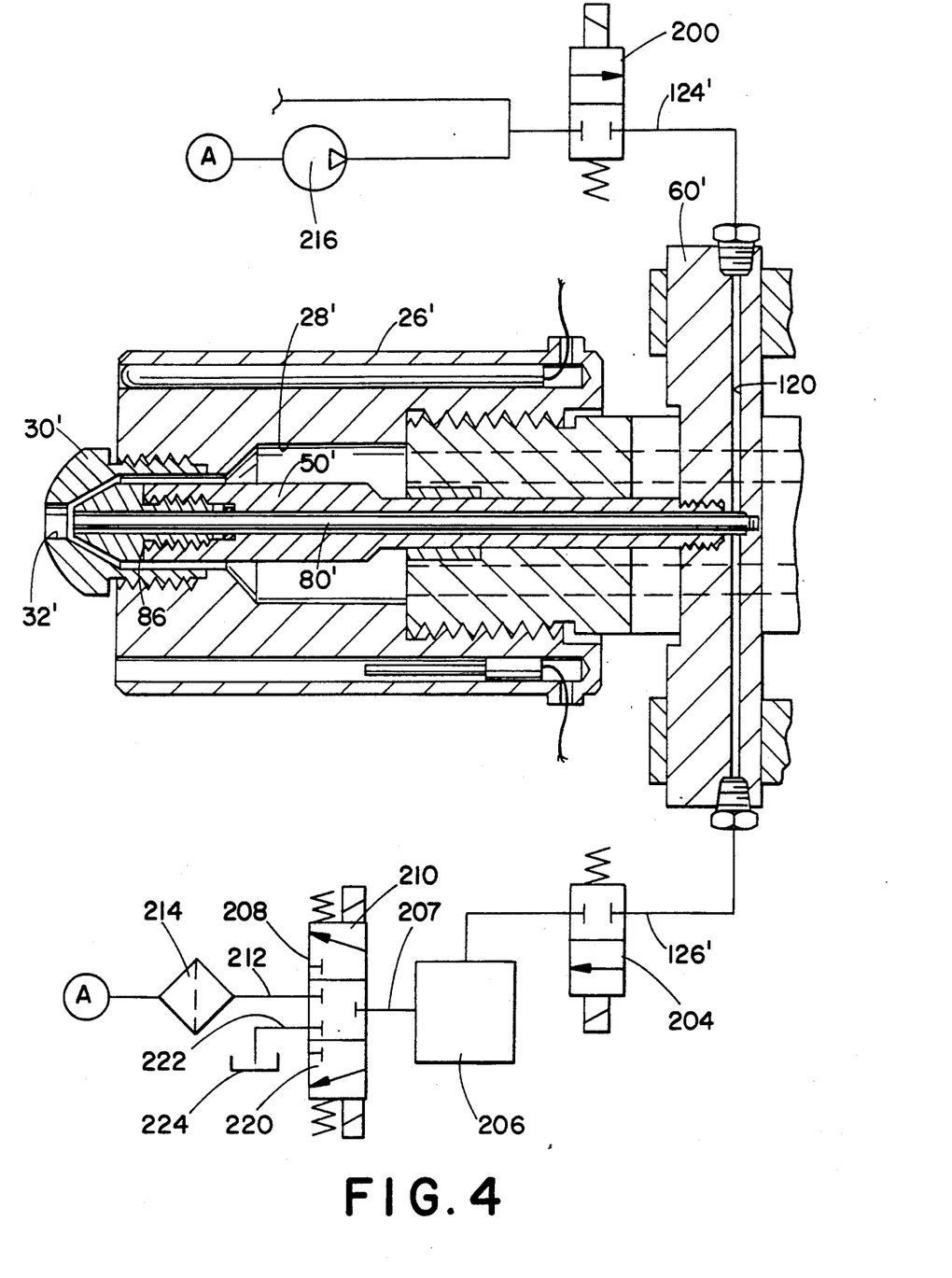
FIG. 4 is a side elevational view in cross-section of a gas assisted injection molding apparatus including a schematic view of an inlet and exhaust system therefor according to a first alternate embodiment of the present invention.

With reference now to FIG. 4, an alternate embodiment of a valving system is there illustrated. For ease of comprehension and appreciation of this alternative, like components will be identified by like numerals with a primed suffix (') and new components will be identified by new numerals.

In this embodiment of the invention, a nozzle A' includes a barrel housing 26' and a tip 30'. Extending longitudinally through the barrel housing and tip are respective apertures or bores 28' and 32' to create a flow path for molten thermoplastic to flow into a mold body. Mounted for reciprocation in the nozzle A' is a suitable barrel 50'. Extending longitudinally through the barrel is a bore 62'. Located in the bore 62' is a pin 80' which is of suitable diameter so as to allow a flow of gas through a preferably annular gas passage 86' defined therebetween. A cross bar 60' reciprocates the barrel 50' as well as the pin 80'. Extending through the cross bar 60' is a gas flow path 120' which communicates at one end with a first gas line 124' and at a second end with a second gas line 126'. Located in the first gas line 124' is a first directional valve 200, which can be solenoid actuated to an open position and spring biased to a closed position if desired.

When it is desired to vent the gas from the gas cavity created in the plastic held in the mold cavity, the first valve 200 is closed and a second valve 204, which again can be solenoid actuated, is opened in the second line 126'. The gas then flows into a suitable receiver 206. Once a gas cavity in the plastic product is decompressed, the second valve 204 is closed so as to prevent a flow back into the line 124' of the gas. Thereafter, the flow of the gas from the receiver 206, through a line 207, is regulated by a three position three way valve 208. This valve is preferably spring-biased to a center "off" position and solenoid-actuated to either end position. When a first envelope 210 of the valve is selected, the gas held in the receiver 206 can flow through a suitable line 212 through a filter 214 and to a pump 216. The pump will pressurize the gas and allow it to flow into line 124'. When a second envelope 220 of the valve 208 is selected, the gas can flow through a second line 222 to a sump 224 or to the atmosphere.

Figure 5:
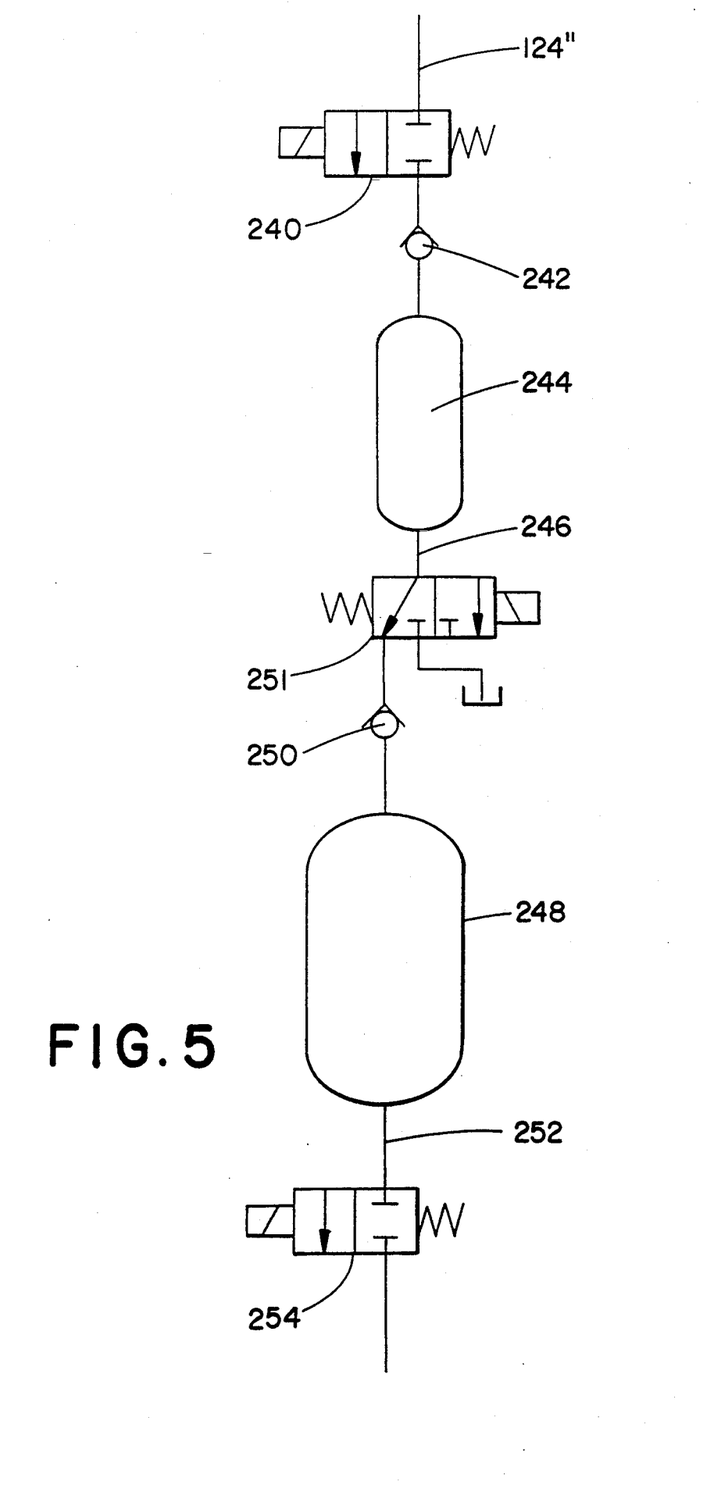
FIG. 5 is a schematic view of an exhaust system for venting the gas according to a second alternate embodiment of the present invention.

With reference now to FIG. 5, a second alternate embodiment of the present invention is there illustrated. For ease of comprehension and appreciation of this alternative, like components will be identified by like numerals with a double primed suffix ('') and new components will be identified by new numerals.

In this embodiment, a gas outflow line 124'' has provided therein a suitable directional valve 240 which allows gas to flow through a first check valve 242 and into a first receiver 244 which may be on the order of 150 cm$^3$. Communicating with a lower end of the receiver 244 is a fluid conduit 246 which also communicates with a second receiver 248. Preferably located in the fluid conduit 246 is a second check valve 250 that can be set to approximately 50 pounds per square inch (psi) or the like. Located between the check valve 250 and the receiver 244 is a second directional control valve 251. This valve can be spring biased to a first position which allows gas flow to the check valve 250 and solenoid actuated to a second position which allows a venting of gas to sump. When the pressure setting of the second check valve 250 is achieved in the line 246, the gas will then be allowed to flow into the second, larger, receiver 248 which can be on the order of 500 cm$^3$. Provided at another end of the receiver 248 is a third gas conduit 252 in which is located a suitable directional valve 254 which selectively allows the flow of gas out of the second receiver 248 so that the gas can subsequently be either vented or recycled as is desired.

With this design an initial quantity of gas is allowed to flow into receiver 244 and thereafter gas is allowed to flow into receiver 248. Gas from receiver 244 can be dumped as illustrated while gas from receiver 248 can be either dumped or recycled.

Figure 6:
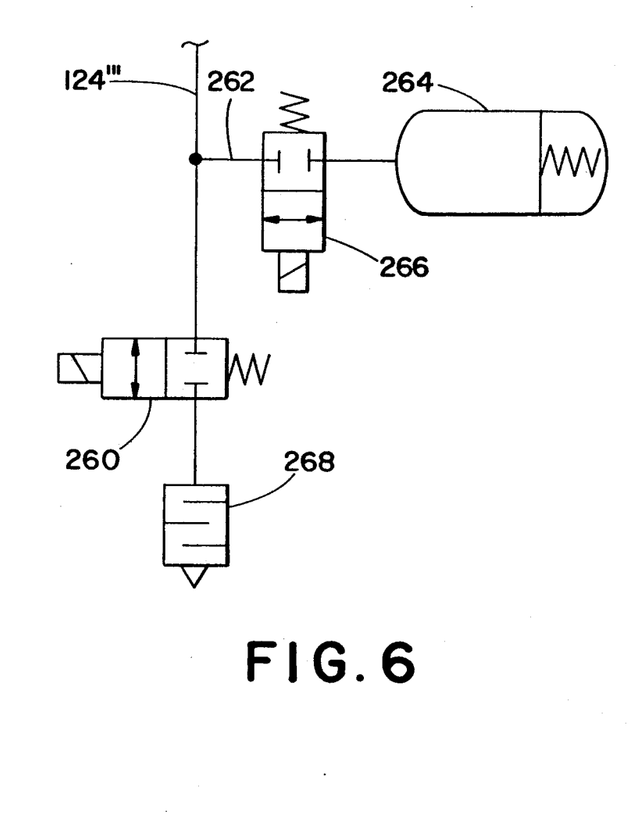
FIG. 6 is a schematic view of an exhaust system for venting the gas according to a third alternate embodiment of the present invention.

With reference now to FIG. 6, a third alternate embodiment of a venting system is there illustrated. For ease of comprehension and appreciation of this alternative, like components will be identified by like numerals with a triple primed suffix (''') and new components will be identified by new numerals.

In this embodiment, a gas outflow line 124''' has provided therein a first directional valve 260. Located upstream of the directional valve 260 is a branch fluid line 262 which leads to an accumulator 264. The accumulator is illustrated as being spring loaded. However, it should be appreciated that the accumulator could also be gas charged or weighted. If desired a standard accumulator without such features could also be utilized. Positioned in the branch line 262 to regulate flow is a second directional valve 266. Gas will initially flow only into the accumulator 264 since only the second valve 266 is opened whereas the first valve 260 remains closed. The accumulator 264 is so sized that only a limited amount of the gas held in the gas cavity formed in the injection molded part can flow out of the gas cavity. This allows the injection molded part to set up, as mentioned. Subsequently, perhaps one to five seconds later, the first valve 260 is opened. This allows gas, both from the gas cavity and from the accumulator 264, to flow out through line 124''' through a suitable conventional muffler 268 and into the atmosphere. One such muffler is an industrial muffler sold by SuperTrapp Industries, Inc. of West Sacramento, Calif.

Figure 7:
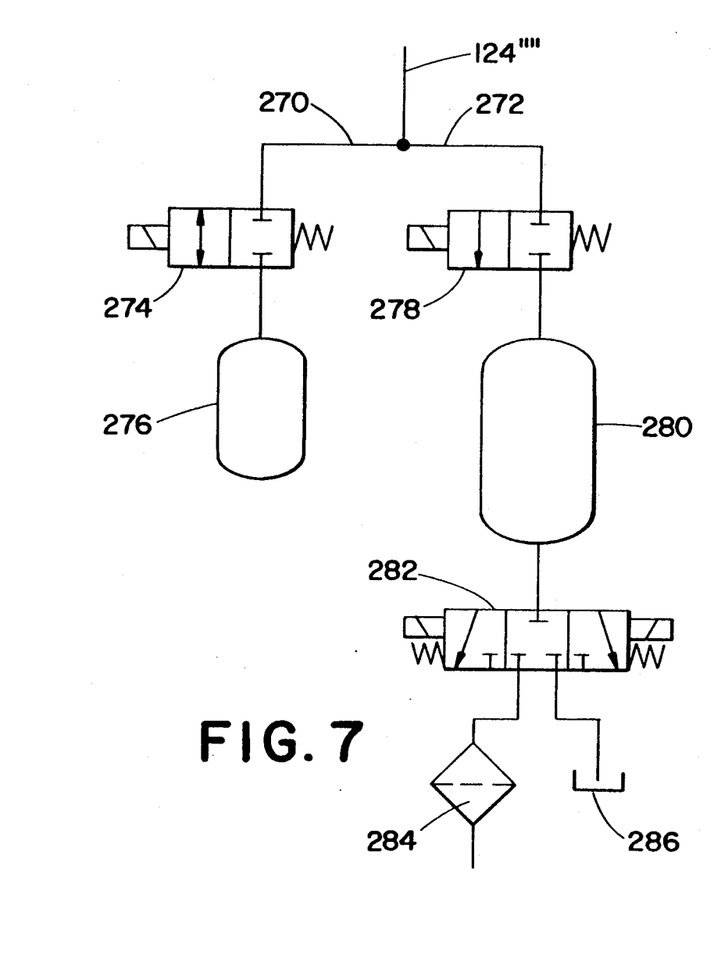
FIG. 7 is a schematic view of an exhaust system for venting the gas according to a fourth alternate embodiment of the present invention.

With reference now to FIG. 7, a fourth alternate embodiment of a system for venting is there illustrated. For ease of comprehension and appreciation of this alternative, like components will be identified by like numerals with a quadruple primed suffix ('''') and new components will be identified by new numerals.

In this embodiment, an outlet line 124'''' separates into two branches 270 and 272. Located in the first branch is a first directional control valve 274, which can be solenoid actuated. This valve selectively allows the flow of gas into a small sized accumulator 276. Located in the second branch 272 is a second directional control valve 278 which selectively allows the flow of gas into a relatively larger receiver 280.

Gas in line 124'''' initially flows only into the small sized accumulator 276 since only the first valve 274 is opened. Only a limited amount of gas can thus flow out of the gas cavity. Subsequently, perhaps one second later, the second directional valve 278 is opened thereby allowing gas to flow into the larger sized receiver 280. The gas held in the accumulator 276 can now also flow into the receiver. Thereafter the two valves 274 and 278 are shut in order to prevent a backflow of the gas. The gas held in the receiver 280 can then be recycled or vented to sump through the use of a three position three way valve 282 which can be spring biased to a center off position and solenoid actuated to either end position. Gas being recycled will flow through a filter 284 and gas being vented will flow into sump 286. Any contaminants in the gas can be filtered out at this time.

Figure 8:
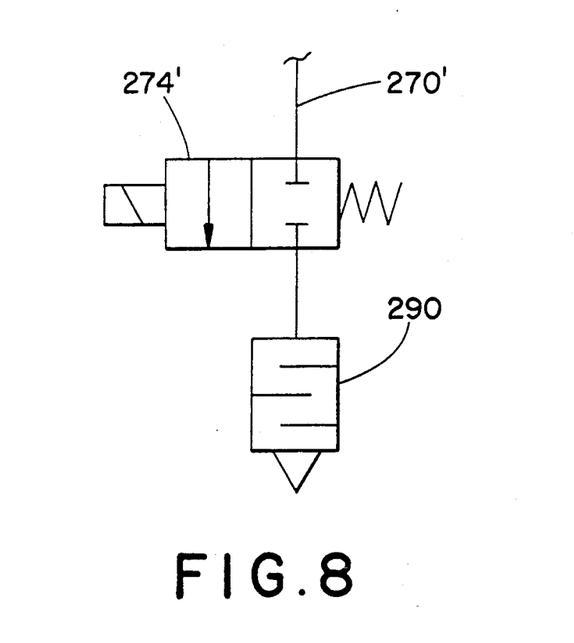
FIG. 8 is a schematic view of an alternate embodiment of a portion of the exhaust system of FIG. 7; and, FIG. 9 is a schematic view of a muffler employed in the system of FIG. 8.
Figure 9:
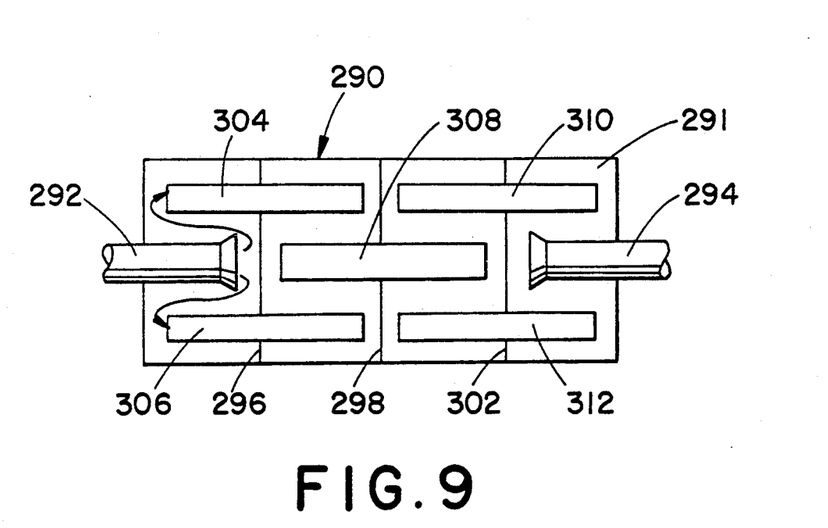

It should be recognized that the gas flowing into the first accumulator 276 in FIG. 7 does not necessarily have to be combined with the gas flowing into the reservoir 280 as shown in FIG. 7. More specifically, a different gas flow system can be provided as illustrated in FIGS. 8 and 9. For ease of comprehension and appreciation of this alternative, like components will be identified by like numerals with a primed suffix (') and new components will be identified by new numerals.

As shown in FIG. 8, a branch 270' can have provided therein a directional valve 274' which regulates the flow through the line 270' to a muffler 290. In this way, gas which flows through the line 270' can be vented into the atmosphere after it flows through the muffler 290. The function of the muffler is to limit the velocity of the gas as it flows through the line 270' and also to reduce the noise of gas exhaust. One type of muffler which may be utilized for this purpose is illustrated in FIG. 9. The muffler provides a tortuous flow path for the gas and includes a casing 291 having an inlet pipe 292 on one end and an outlet pipe 294 on another end. Three transversely extending barriers 296, 298 and 302 are provided in the casing 290. These barriers or plates prevent the flow of the gas in a linear fashion directly through the muffler from the inlet to the outlet. Communicating the chambers defined by the several barriers 296-302 are a plurality of pipes 304, 306, 308, 310 and 312 which extend between the barriers. It should also be noted that the flow of gas through the muffler is such that the gas flow path needs to reverse a number of times since an exhaust end of e.g. the inlet pipe 292 is located past an inlet end of the pipes 304 and 306. A similar design is provided for all of the remaining pipes.

With this design, the gas flow path needs to reverse a number of times thereby successfully slowing the velocity of the gas that flows out through line 270'. With a reduction of the velocity of flow of the gas, more time is provided for the gas channels and the sprue of the injection molded part to set up and solidify. In addition, whatever contaminants there may be in the gas cavity can be exhausted at this time through the muffler 290. Thereafter, the valve 274' can be closed and all further flow of the gas can be directed through the second branch 272 as illustrated in FIG. 7 so that the remaining neutral gas can be recycled in order to reduce the costs of the injection molding operation. It should be noted that whatever contaminants might remain in the gas which flows into the reservoir 280, can be filtered out through the use of suitable filters 284.

The invention has been described with reference to preferred and alternate embodiments. Obviously, modifications and alterations will occur to others upon the reading and understanding of this specification. It is intended to include all such modifications and alterations insofar as they come within the scope of the appended claims or the equivalents thereof.

What is claimed is:

1. A method for injecting a viscous fluid and a non-viscous fluid into a mold cavity of a mold body, the method comprising:

regulating a flow of the viscous fluid through a nozzle body discharge end and into a mold cavity with a valve element, said valve element being mounted for reciprocation in a nozzle body flow passage and comprising a barrel having a first end, said first end selectively engaging a portion of the nozzle body discharge end to prevent a flow of the viscous fluid therepast, and a second end, and a bore extending longitudinally through said barrel;

positioning a pin in said barrel bore such that a first end of said pin is located adjacent a first end of said barrel;

operatively securing said pin to said barrel such that said pin moves with said barrel as said barrel reciprocates;

defining a non-viscous fluid flow passage between said pin and said barrel;

flowing the viscous fluid through the nozzle body flow passage around the barrel and into the mold cavity; and, flowing the non-viscous fluid through the non-viscous fluid flow passage around the pin and into the mold cavity.

2. The process of claim 1 further comprising the step of venting the non-viscous fluid from the mold cavity.

3. The process of claim 2 wherein said step of venting further comprises the step of muffling a flow of the non-viscous fluid.

4. The process of claim 2 further comprising the step of recycling the non-viscous fluid.

5. The process of claim 4 further comprising the step of removing contaminants from the non-viscous fluid before said step of recycling.

6. The process of claim 1 further comprising the step of cleaning said non-viscous fluid flow passage by flowing a high pressure fluid therethrough.

7. The process of claim 1 further comprising the step of cooling the non-viscous fluid in the mold cavity.

8. A process for fluid-assisted injection molding comprising:

providing a mold body including a mold cavity;

positioning a nozzle body adjacent said mold body, said nozzle body comprising an inlet end, a discharge end which communicates with said mold cavity, and a flow passage for a viscous fluid extending from said inlet end to said discharge end;

mounting a valve element for reciprocation in said nozzle body flow passage to control a flow of the viscous fluid through said nozzle body discharge end;

defining a flow passage in said valve element for flow of a non-viscous fluid;

introducing the viscous fluid through said viscous fluid flow passage into the mold cavity;

introducing the non-viscous fluid through said non-viscous fluid flow passage into the mold cavity;

forming a non-viscous fluid cavity in the viscous fluid held in the mold cavity; and, venting the non-viscous fluid from the non-viscous fluid cavity formed in the viscous fluid held in the mold cavity, wherein said step of venting comprises the subsidiary steps of first flowing an initial portion of the non-viscous fluid into a first small volume container which cannot accommodate all of the volume of the non-viscous fluid and then flowing a remaining portion of the non-viscous fluid into a second, larger, container.

9. The process of claim 8 further comprising the steps of:

venting the non-viscous fluid from the first container to sump; and recycling the non-viscous fluid from the second container.

10. The process of claim 8 further comprising the step of flowing contaminants in the non-viscous fluid cavity into the first container.

11. The process of claim 8 wherein said step of venting further comprises the subsidiary step of muffling a flow of the non-viscous fluid as it flows out of the non-viscous fluid cavity.

12. The process of claim 8 further comprising the steps of:
   flowing a remaining portion of the non-viscous fluid into a second container;
   filtering the non-viscous fluid; and,
   recycling at least a portion of the non-viscous fluid.

13. A process for gas-assisted injection molding to produce an injection molded product, comprising:
   providing a valve element mounted for reciprocation in a nozzle body flow passage to control a flow of a thermoplastic through a nozzle body discharge end and into a mold cavity, said valve element comprising:
   a barrel assembly including a barrel having a first end, said first end selectively engaging the nozzle body discharge end to prevent a flow of thermoplastic therepast and a second end,
   a bore extending longitudinally through said barrel;
   a pin located in said barrel bore, said pin having a first end located adjacent said barrel first end and a second end secured to said barrel assembly such that said pin moves with said barrel as said barrel reciprocates, and
   a gas flow passage defined between said pin and said barrel;
   retracting the barrel, and the pin therein, to introduce a molten stream of thermoplastic through the nozzle body flow passage and into the mold cavity;
   introducing a gas through the gas flow passage into the mold cavity;
   forming a gas cavity in the thermoplastic material held in the mold cavity;
   urging the thermoplastic material toward a surface of the mold cavity;
   cooling a hollow shaped body so formed to a temperature below a softening point of the thermoplastic material thereby allowing the product to take its final shape; and,
   venting the gas.

14. The process of claim 13 wherein said step of venting comprises the subsidiary step of flowing at least a portion of the gas initially into a container.

15. The process of claim 14 further comprising the steps of:
   flowing the gas out of the container and through a fluid line; and
   muffling a flow of the gas through the fluid line.

16. The process of claim 13 wherein said step of venting comprises the subsidiary steps of:
   allowing an initial portion of the gas to flow through a first fluid line;
   muffling the flow of the gas through said first fluid line; and,
   allowing a remaining portion of the gas to flow into a receiver.

17. The process of claim 13 wherein said step of venting comprises the subsidiary steps of:
   initially flowing a first portion of the gas into a first container; and,
   subsequently flowing a second portion of the gas into a second container.

18. The process of claim 17 further comprising the steps of:
   venting the gas from the first container to a sump; and,
   recycling the gas from the second container.

19. The process of claim 13 further comprising the step of cleaning the gas flow passage by flowing a high pressure fluid therethrough.

20. A method for employing an injection molding nozzle for forming an injection molded part by injecting a viscous fluid and a non-viscous fluid into a mold cavity of a mold body, the method comprising the steps of:
   controlling a flow of the viscous fluid through a nozzle body discharge end into the mold cavity by a valve element mounted for reciprocation in a nozzle body flow passage, the valve element comprising:
   a barrel having a first end, said first end selectively engaging a portion of the nozzle body discharge end to prevent a flow of the viscous fluid therepast and a second end,
   a bore extending longitudinally through the barrel, and,
   a pin located in said barrel bore and fixedly secured to the valve element, the pin and barrel bore defining between them a flow passage for flow of the non-viscous fluid;
   flowing the viscous fluid through the nozzle body flow passage and into the mold cavity;
   flowing the non-viscous fluid through the flow passage defined between the pin and the barrel bore and into the mold cavity;
   forming a non-viscous fluid cavity in the viscous fluid in the mold cavity;
   cooling the viscous fluid to form the injection molded part;
   reducing the pressure of the non-viscous fluid held in the non-viscous fluid cavity by venting a portion of the non-viscous fluid held in the non-viscous fluid cavity;
   simultaneously preventing additional non-viscous fluid from flowing into the non-viscous fluid cavity;
   further cooling the viscous fluid; and,
   further reducing the pressure of the non-viscous fluid held in the non-viscous fluid cavity by venting a remaining portion of the non-viscous fluid held in the non-viscous fluid cavity.

21. The method of claim 20 further comprising the step of venting a remaining portion of the non-viscous fluid from the non-viscous fluid cavity.

22. The method of claim 21 further comprising the step of recycling the remaining portion of the non-viscous fluid.

23. The method of claim 20 further comprising the step of cooling a remaining portion of the non-viscous fluid in the non-viscous fluid cavity, said step of cooling occurring after said step of venting a portion of the non-viscous fluid.

24. The method of claim 20 further comprising the step of vent contaminants from said non-viscous fluid cavity.

25. The method of claim 20 further comprising the step of muffling a flow of the portion of the non-viscous fluid after said step of venting.

26. The method of claim 20 further comprising the step of cleaning said non-viscous fluid flow passage by flowing a high pressure fluid therethrough.

* * * * *